(12) United States Patent
Brunn et al.

(10) Patent No.: US 8,942,312 B1
(45) Date of Patent: Jan. 27, 2015

(54) WCDMA MODULATION

(71) Applicant: Marvell International Ltd., Hamilton (BM)

(72) Inventors: Brian Brunn, Bee Cave, TX (US); Marc Leroux, Austin, TX (US); Gregory Uehara, Kaneohe, HI (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/964,376

(22) Filed: Aug. 12, 2013

Related U.S. Application Data

(63) Continuation of application No. 12/767,922, filed on Apr. 27, 2010, now Pat. No. 8,520,771.

(60) Provisional application No. 61/173,897, filed on Apr. 29, 2009.

(51) Int. Cl.
*H04L 25/49* (2006.01)
*H04L 7/00* (2006.01)
*H04B 1/04* (2006.01)

(52) U.S. Cl.
CPC .................. *H04B 1/0475* (2013.01)
USPC ............................ 375/296; 375/297; 375/355

(58) Field of Classification Search
USPC .......... 375/285, 295, 296, 297, 355; 332/124, 332/125, 159, 160
See application file for complete search history.

(56) References Cited

U.S. PATENT DOCUMENTS

| | | | |
|---|---|---|---|
| 4,449,190 A | 5/1984 | Flanagan et al. | |
| 5,134,633 A | 7/1992 | Werner | |
| 5,245,704 A | 9/1993 | Weber et al. | |
| 5,623,474 A | 4/1997 | Oshio et al. | |
| 5,650,860 A | 7/1997 | Uz | |
| 5,778,029 A | 7/1998 | Kaufman | |
| 5,930,299 A | 7/1999 | Vannatta et al. | |
| 6,031,628 A | 2/2000 | Jacob et al. | |
| 6,222,889 B1 | 4/2001 | Lee | |
| 6,255,906 B1 * | 7/2001 | Eidson et al. | 330/124 R |
| 6,266,517 B1 | 7/2001 | Fitzpatrick et al. | |
| 6,275,685 B1 | 8/2001 | Wessel et al. | |
| 6,639,944 B1 | 10/2003 | De Haan et al. | |
| 6,667,659 B2 | 12/2003 | Stengel et al. | |
| 6,731,406 B1 | 5/2004 | Ganapathy et al. | |
| 6,829,313 B1 | 12/2004 | Xu | |
| 6,912,249 B2 | 6/2005 | Haartsen | |
| 6,950,469 B2 | 9/2005 | Karczewicz et al. | |
| 6,983,026 B2 | 1/2006 | Pinckley et al. | |
| 7,023,941 B1 | 4/2006 | Rey et al. | |
| 7,173,992 B2 | 2/2007 | Frigon | |
| 7,180,901 B2 | 2/2007 | Chang et al. | |
| 7,200,799 B2 | 4/2007 | Wang et al. | |
| 7,213,194 B2 | 5/2007 | Nieminen | |
| 7,218,786 B2 | 5/2007 | Lin | |

(Continued)

OTHER PUBLICATIONS

"Non-Final Office Action", U.S. Appl. No. 13/951,203, Apr. 2, 2014, 4 pages.

(Continued)

*Primary Examiner* — Tesfaldet Bocure (57) ABSTRACT

This disclosure describes techniques for modulating data. In one embodiment, these techniques include receiving an I or Q value, generating a time-shifted sample of a shaped pulse based on the I or Q value, and providing the time-shifted sample to a digital-to-analog converter.

20 Claims, 4 Drawing Sheets

(56) References Cited

U.S. PATENT DOCUMENTS

| | | |
|---|---|---|
| 7,262,722 B1 | 8/2007 | Jahanghir et al. |
| 7,362,818 B1 | 4/2008 | Smith et al. |
| 7,418,057 B2 | 8/2008 | Shako et al. |
| 7,447,274 B2 | 11/2008 | Shako et al. |
| 7,450,641 B2 | 11/2008 | Sun et al. |
| 7,466,762 B2 | 12/2008 | Shako et al. |
| 7,532,590 B2 | 5/2009 | Ok et al. |
| 7,599,431 B1 | 10/2009 | Anderson et al. |
| 7,675,886 B2 | 3/2010 | Agrawal et al. |
| 7,684,627 B2 | 3/2010 | Ranganathan |
| 7,702,020 B2 | 4/2010 | Gallant et al. |
| 7,706,475 B1 | 4/2010 | Kopikare et al. |
| 7,782,951 B2 | 8/2010 | Muthukrishnan et al. |
| 7,782,973 B2 | 8/2010 | Kim et al. |
| 7,822,147 B2 | 10/2010 | Huang et al. |
| 7,965,710 B1 | 6/2011 | Choi |
| 7,969,964 B2 | 6/2011 | Kim et al. |
| 7,991,063 B2 | 8/2011 | Khan et al. |
| 8,014,737 B2 | 9/2011 | Pratt et al. |
| 8,059,588 B2 | 11/2011 | Sood |
| 8,059,630 B2 | 11/2011 | Prateek |
| 8,160,150 B2 | 4/2012 | Moore |
| 8,223,872 B1 | 7/2012 | Zhang et al. |
| 8,311,031 B2 | 11/2012 | Kim et al. |
| 8,345,533 B1 | 1/2013 | Zhao |
| 8,345,714 B2 | 1/2013 | Ryu et al. |
| 8,442,107 B2 | 5/2013 | Cho et al. |
| 8,498,342 B1 | 7/2013 | Sha et al. |
| 8,520,771 B1 | 8/2013 | Brunn et al. |
| 8,542,571 B2 | 9/2013 | Kim et al. |
| 8,542,725 B1 | 9/2013 | Qian et al. |
| 8,565,325 B1 | 10/2013 | Banerjea |
| 8,576,830 B2 | 11/2013 | Swarts et al. |
| 8,614,994 B2 | 12/2013 | Swarts et al. |
| 8,681,730 B2 | 3/2014 | Swarts et al. |
| 8,681,893 B1 | 3/2014 | Brunn et al. |
| 8,761,261 B1 | 6/2014 | Wang |
| 8,817,771 B1 | 8/2014 | Zhao et al. |
| 8,897,393 B1 | 11/2014 | Zhang et al. |
| 8,902,994 B1 | 12/2014 | Sha et al. |
| 8,908,754 B1 | 12/2014 | Qian et al. |
| 2002/0053058 A1 | 5/2002 | Lee et al. |
| 2002/0067773 A1 | 6/2002 | Jackson et al. |
| 2002/0072346 A1 | 6/2002 | Kato et al. |
| 2003/0098804 A1 | 5/2003 | Ekstrand et al. |
| 2003/0108135 A1 | 6/2003 | Frigon |
| 2003/0126551 A1 | 7/2003 | Mantha et al. |
| 2003/0164736 A1 | 9/2003 | Stengel et al. |
| 2003/0179831 A1* | 9/2003 | Gupta et al. ............... 375/296 |
| 2004/0090909 A1 | 5/2004 | Khlat |
| 2004/0141525 A1 | 7/2004 | Bhushan et al. |
| 2004/0148546 A1 | 7/2004 | Meyer et al. |
| 2004/0223473 A1 | 11/2004 | Ha et al. |
| 2004/0232984 A1 | 11/2004 | Meade et al. |
| 2005/0018519 A1 | 1/2005 | Nii |
| 2005/0213661 A1 | 9/2005 | Xiang et al. |
| 2005/0231292 A1 | 10/2005 | Akahori et al. |
| 2005/0243946 A1 | 11/2005 | Chung et al. |
| 2005/0276266 A1 | 12/2005 | Terry |
| 2006/0084389 A1 | 4/2006 | Beale et al. |
| 2006/0126962 A1 | 6/2006 | Sun |
| 2006/0174236 A1 | 8/2006 | Stein et al. |
| 2006/0227895 A1 | 10/2006 | Booth et al. |
| 2007/0016838 A1 | 1/2007 | Mielczarek et al. |
| 2007/0025448 A1 | 2/2007 | Cha et al. |
| 2007/0086528 A1 | 4/2007 | Mauchly et al. |
| 2007/0092013 A1 | 4/2007 | Cahn et al. |
| 2007/0118791 A1 | 5/2007 | Hepler et al. |
| 2007/0135065 A1 | 6/2007 | Leffel et al. |
| 2007/0241812 A1 | 10/2007 | Yang et al. |
| 2008/0031376 A1 | 2/2008 | Ban |
| 2008/0040411 A1 | 2/2008 | Stojancic et al. |
| 2008/0043702 A1 | 2/2008 | Moon et al. |
| 2008/0049709 A1 | 2/2008 | Pan et al. |
| 2008/0074289 A1 | 3/2008 | Sauder et al. |
| 2008/0089282 A1 | 4/2008 | Malladi et al. |
| 2008/0090583 A1 | 4/2008 | Wang et al. |
| 2008/0094280 A1 | 4/2008 | Fenton |
| 2008/0123515 A1 | 5/2008 | Boehlke et al. |
| 2008/0219373 A1 | 9/2008 | Zhang et al. |
| 2008/0247467 A1 | 10/2008 | Rusanovskyy et al. |
| 2008/0270344 A1 | 10/2008 | Yurick et al. |
| 2008/0279322 A1 | 11/2008 | Franovici et al. |
| 2009/0003472 A1* | 1/2009 | Dent ............................ 375/260 |
| 2009/0086820 A1 | 4/2009 | Hong et al. |
| 2009/0097533 A1 | 4/2009 | Lakkis |
| 2009/0103622 A1 | 4/2009 | Tripathi et al. |
| 2009/0154557 A1 | 6/2009 | Zhao et al. |
| 2009/0181622 A1 | 7/2009 | Hardacker |
| 2009/0213946 A1 | 8/2009 | Dick et al. |
| 2009/0257526 A1 | 10/2009 | Wang et al. |
| 2009/0310704 A1 | 12/2009 | Jethanandani et al. |
| 2010/0035554 A1 | 2/2010 | Ba et al. |
| 2010/0061306 A1 | 3/2010 | Ryu et al. |
| 2010/0077275 A1 | 3/2010 | Yu et al. |
| 2010/0135257 A1 | 6/2010 | Higuchi et al. |
| 2010/0239034 A1 | 9/2010 | Lee et al. |
| 2011/0007717 A1 | 1/2011 | Swarts et al. |
| 2011/0007718 A1 | 1/2011 | Swarts et al. |
| 2011/0013730 A1 | 1/2011 | Mansson et al. |
| 2013/0021976 A1 | 1/2013 | Yang et al. |
| 2013/0142060 A1 | 6/2013 | Challa et al. |

OTHER PUBLICATIONS

"Notice of Allowance", U.S. Appl. No. 13/182,004, Apr. 9, 2014, 7 pages.

"Corrected Notice of Allowance", U.S. Appl. No. 12/253,078, Jul. 25, 2014, 6 pages.

"Final Office Action", U.S. Appl. No. 14/058,879, Jul. 15, 2014, 13 pages.

"Notice of Allowance", U.S. Appl. No. 12/253,078, Jun. 20, 2014, 8 pages.

"Notice of Allowance", U.S. Appl. No. 13/951,203, Jul. 31, 2014, 6 pages.

"Notice of Allowance", U.S. Appl. No. 13/966,753, Jul. 30, 2014, 10 pages.

"Advisory Action", U.S. Appl. No. 11/945,151, (Nov. 22, 2010), 3 pages.

"Advisory Action", U.S. Appl. No. 11/945,183, (Nov. 9, 2010), 2 pages.

"Final Office Action", U.S. Appl. No. 11/945,151, (Aug. 26, 2011), 20 pages.

"Final Office Action", U.S. Appl. No. 11/945,151, (Sep. 10, 2010), 27 pages.

"Final Office Action", U.S. Appl. No. 11/945,183, (Sep. 13, 2010), 12 pages.

"Final Office Action", U.S. Appl. No. 12/253,078, (Feb. 13, 2013), 21 pages.

"Final Office Action", U.S. Appl. No. 12/269,744, (Sep. 19, 2012), 13 pages.

"Final Office Action", U.S. Appl. No. 12/397,057, (Feb. 1, 2013), 13 pages.

"Final Office Action", U.S. Appl. No. 12/397,057, (Apr. 27, 2012), 11 pages.

"Final Office Action", U.S. Appl. No. 12/510,716, (Jun. 28, 2012), 10 pages.

"Final Office Action", U.S. Appl. No. 12/511,606, (Sep. 13, 2012), 8 pages.

"Final Office Action", U.S. Appl. No. 12/511,629, (Dec. 7, 2012), 7 pages.

"Final Office Action", U.S. Appl. No. 12/574,879, (Oct. 1, 2013), 9 pages.

"Final Office Action", U.S. Appl. No. 12/574,879, (Nov. 20, 2012), 13 pages.

"Non-Final Office Action", U.S. Appl. No. 11/945,151, (Mar. 25, 2010), 22 pages.

"Non-Final Office Action", U.S. Appl. No. 11/945,151, (Mar. 28, 2011), 22 pages.

(56) References Cited

OTHER PUBLICATIONS

"Non-Final Office Action", U.S. Appl. No. 11/945,183, (Apr. 5, 2010), 8 pages.
"Non-Final Office Action", U.S. Appl. No. 12/253,078, (Jun. 8, 2012), 18 pages.
"Non-Final Office Action", U.S. Appl. No. 12/269,744, (Feb. 16, 2012), 14 pages.
"Non-Final Office Action", U.S. Appl. No. 12/269,744, (Aug. 18, 2011), 10 pages.
"Non-Final Office Action", U.S. Appl. No. 12/397,057, (Nov. 9, 2011), 7 pages.
"Non-Final Office Action", U.S. Appl. No. 12/397,057, (Aug. 1, 2012), 10 pages.
"Non-Final Office Action", U.S. Appl. No. 12/510,716, (Oct. 23, 2013), 12 pages.
"Non-Final Office Action", U.S. Appl. No. 12/510,716, (Nov. 8, 2011), 8 pages.
"Non-Final Office Action", U.S. Appl. No. 12/511,606, (Aug. 22, 2013), 8 pages.
"Non-Final Office Action", U.S. Appl. No. 12/511,606, (Jan. 4, 2012), 6 pages.
"Non-Final Office Action", U.S. Appl. No. 12/511,629, (Apr. 13, 2012), 6 pages.
"Non-Final Office Action", U.S. Appl. No. 12/540,753, (Apr. 5, 2012), 14 pages.
"Non-Final Office Action", U.S. Appl. No. 12/574,879, (Apr. 23, 2013), 13 pages.
"Non-Final Office Action", U.S. Appl. No. 12/574,879, (Jun. 4, 2012), 11 pages.
"Non-Final Office Action", U.S. Appl. No. 12/767,922, (Nov. 2, 2012), 12 pages.
"Non-Final Office Action", U.S. Appl. No. 13/182,004, (May 21, 2013), 9 pages.
"Non-Final Office Action", U.S. Appl. No. 13/182,004, (Oct. 22, 2013), 14 pages.
"Notice of Allowance", U.S. Appl. No. 11/945,183, (Feb. 23, 2011), 7 pages.
"Notice of Allowance", U.S. Appl. No. 12/269,744, (Apr. 10, 2013), 11 pages.
"Notice of Allowance", U.S. Appl. No. 12/397,057, (May 15, 2013), 7 pages.
"Notice of Allowance", U.S. Appl. No. 12/511,629, (Mar. 28, 2013), 7 pages.
"Notice of Allowance", U.S. Appl. No. 12/540,753, (Aug. 27, 2012), 5 pages.
"Notice of Allowance", U.S. Appl. No. 12/574,879, (Oct. 31, 2013), 7 pages.
"Notice of Allowance", U.S. Appl. No. 12/767,922, (Apr. 16, 2013), 5 pages.
"Part 16: Air Interface for Fixed and Mobile Broadband Wireless Access Systems; Amendment 2: Physical and Medium Access Control Layers for Combined Fixed and Mobile Operation in Licensed Bands", IEEE Std 802.16e, (Feb. 28, 2006), 822 pages.
"Part 16: Air Interface for Fixed Broadband Wireless Access Systems", IEEE Std. 802.16, (Oct. 1, 2004), 857 pages.
"Restriction Requirement", U.S. Appl. No. 12/269,744, (Jun. 22, 2011), 6 pages.
"Supplemental Notice of Allowance", U.S. Appl. No. 12/269,744, (May 20, 2013), 8 pages.
"Supplemental Notice of Allowance", U.S. Appl. No. 12/269,744, (Jul. 1, 2013), 8 pages.
"Supplemental Notice of Allowance", U.S. Appl. No. 12/269,744, (Aug. 23, 2013), 7 pages.
"Supplemental Notice of Allowance", U.S. Appl. No. 12/397,057, (Aug. 26, 2013), 2 pages.
Mujtaba, Syed A., "TGn Sync Proposal Technical Specification", IEEE 802.11-04 / Wireless LANs, (May 2005), pp. 1-131.
Zhang, Hongyuan et al., "U.S. Appl. No. 12/098,222", (Apr. 4, 2008), 78 pages.
"Non-Final Office Action", U.S. Appl. No. 14/058,879, Jan. 31, 2014, 12 pages.
"Non-Final Office Action", U.S. Appl. No. 12/253,078, Nov. 21, 2013, 25 pages.
"Notice of Allowance", U.S. Appl. No. 12/510,716, Feb. 6, 2014, 6 pages.
"Non-Final Office Action", U.S. Appl. No. 13/966,753, Dec. 24, 2013, 8 pages.
"Non-Final Office Action", U.S. Appl. No. 14/095,021, Oct. 1, 2014, 9 pages.
"Notice of Allowance", U.S. Appl. No. 14/058,879, Sep. 23, 2014, 11 pages.

\* cited by examiner

WCDMA MODULATION

RELATED APPLICATION

This application is a continuation of and claims priority to U.S. Utility patent application Ser. No. 12/767,922 filed Apr. 27, 2010 now issued as U.S. Pat. No. 8,520,771 on Aug. 27, 2013 which in turn claims priority to U.S. Provisional Patent Application Ser. No. 61/173,897 filed Apr. 29, 2009, the disclosure of which is incorporated by reference herein in its entirety.

BACKGROUND

Conventional methods of modulating data for transmission via Wideband Code Division Multiple Access (WCDMA) communications often require extensive computational logic. This computational logic uses registers that generate high peak and average current. This peak and average current may generate radio frequency noise, which causes poor transmission quality and throughput. The radio frequency noise also translates into high development costs associated with correcting such issues. Furthermore, these registers require a large amount of die area, which can be expensive.

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

SUMMARY

This summary is provided to introduce subject matter that is further described below in the Detailed Description and Drawings. Accordingly, this Summary should not be considered to describe essential features nor used to limit the scope of the claimed subject matter.

In one embodiment, a system is described that includes a digital-to-analog converter, a pulse-shape lookup-table, and an indexed pulse-shape-generator configured to receive an I or Q value, retrieve a pulse-shape coefficient from the pulse-shape lookup-table, create a time-shifted sample of a shaped pulse based on the I or Q value and the pulse-shape coefficient, and provide the time-shifted sample to the digital-to-analog converter.

In another embodiment a method is described that comprises receiving an I or Q value, generating a time-shifted sample of a shaped pulse based on the I or Q value, and providing the time-shifted sample to a digital-to-analog converter.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different instances in the description and the figures indicate similar or identical items.

DETAILED DESCRIPTION

Figure 1:
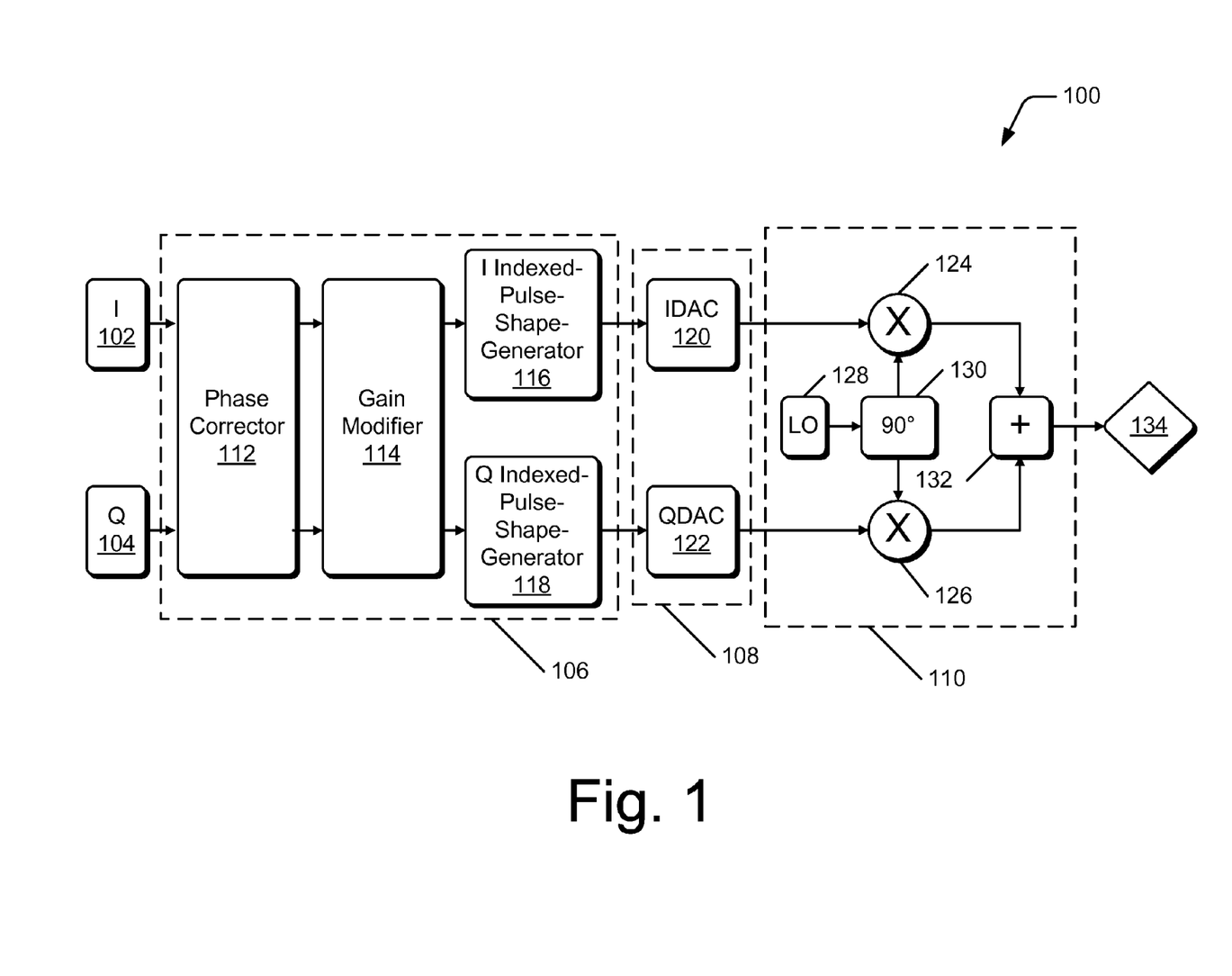
FIG. 1 illustrates an operating environment configured to reduce computational logic when modulating data for WCDMA.

FIG. 1 illustrates an operating environment 100 in which techniques described herein may operate to transform I and Q values into a transmittable signal for use in Wideband Code Division Multiple Access (WCDMA) communications.

Operating environment 100 receives I value 102 and Q value 104 and processes these values using modulator 106, converter 108, and transmission processor 110. By so doing, operating environment 100 transforms I and Q values into a transmittable signal.

In the embodiment illustrated in FIG. 1, modulator 106 receives I value 102 and Q value 104 at phase corrector 112, which corrects these values for phase and passes the phase-corrected values to gain modifier 114. Gain modifier 114 modifies the gain for these phase-corrected values and passes each of the gain-modified, phase-corrected values to pulse-shape-generator 116 or 118. I indexed, pulse-shape-generator 116 time shifts the gain-modified, phase-corrected I value and passes this time-shifted sample to converter 108. Similarly, Q indexed, pulse-shape-generator 118 time shifts the gain-modified, phase-corrected Q value and passes this time-shifted sample to converter 108.

These time-shifted samples may then be converted into analog signals by converter 108, here illustrated with I values converted by I digital-to-analog converter (IDAC) 120 and Q values by Q digital-to-analog converter (QDAC) 122. Once converted into analog signals, transmission processor 110 may further process these analog signals for use in WCDMA communications. To do so, transmission processor 110 includes mixers 124 and 126, a local oscillator (LO) 128, a quadrature circuit 130, and a combiner 132, though other structures and manners may also or instead by used. These operate to provide a transmittable signal 134.

Ways in which modulator 106 processes I and Q values, as well as operations of converter 108 and transmission processor 110, are described in greater detail below.

For example, consider a non-limiting, detailed embodiment for illustrative purposes in which I value 102 and Q value 104 are received by phase corrector 112 at a rate of 3.84 million I and Q values per second. Here I value 102 and Q value 104 are the product of phase-shift-keying (PSK). PSK maps binary data to In-phase Quadrature-phase (IQ) constellation symbols. An IQ constellation symbol is a plot of an In-phase (I) value along a horizontal axis and a Quadrature-phase (Q) value along a vertical axis.

Figure 2:
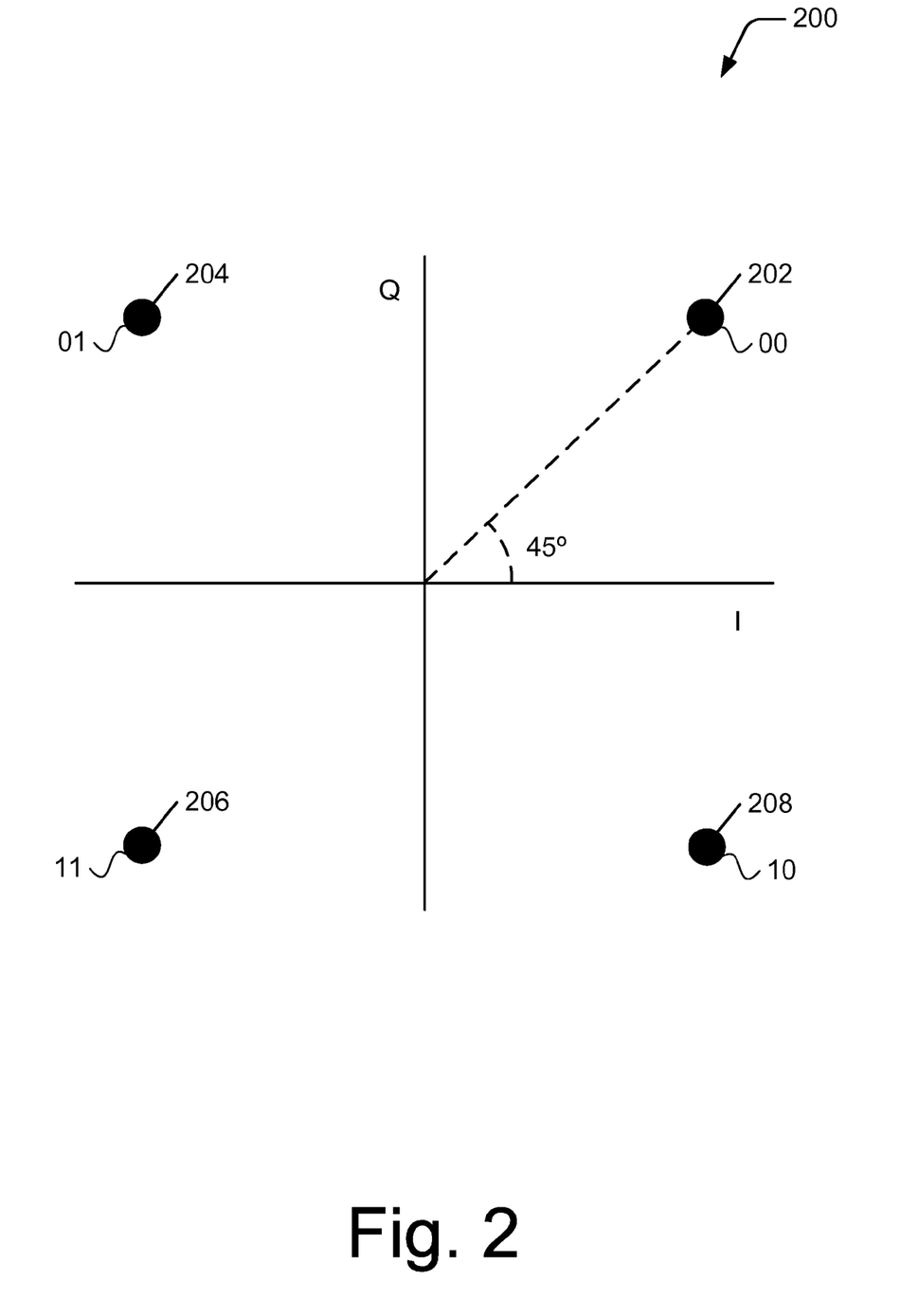
FIG. 2 illustrates a Quadrature-PSK constellation.

FIG. 2 illustrates a Quadrature-PSK IQ symbol constellation 200 having IQ symbols 202, 204, 206, and 208. IQ symbol 202 has a phase of forty-five degrees (shown) and represents binary data of 00, IQ symbol 204 has a phase of 135 degrees and represents binary data of 01, IQ symbol 206 has a phase of 225 degrees and represents binary data of 11, and IQ symbol 208 has a phase of 315 degrees and represents binary data of 10. Note that the I value for a given IQ symbol is the cosine of the symbol's phase while the Q value of the given IQ symbol is the sine of the symbol's phase.

Continuing this detailed example, phase corrector 112 rotates I value 102 and Q value 104 by increments of ten degrees in order to correct for phase distortion. The phase distortion is caused by a conventional analog power-amplifier (not shown), which induces a phase shift. Phase shifts for different power amplifications can be calibrated ahead of time and rotations necessary for correcting each phase shift may be pre-determined and stored. For example, through calibration, it can be pre-determined that a power amplification of X decibels will result in a phase shift of Y degrees. It can then be pre-determined that rotating I value 102 and Q value 104 by Z degrees will correct the phase shift.

Figure 3:
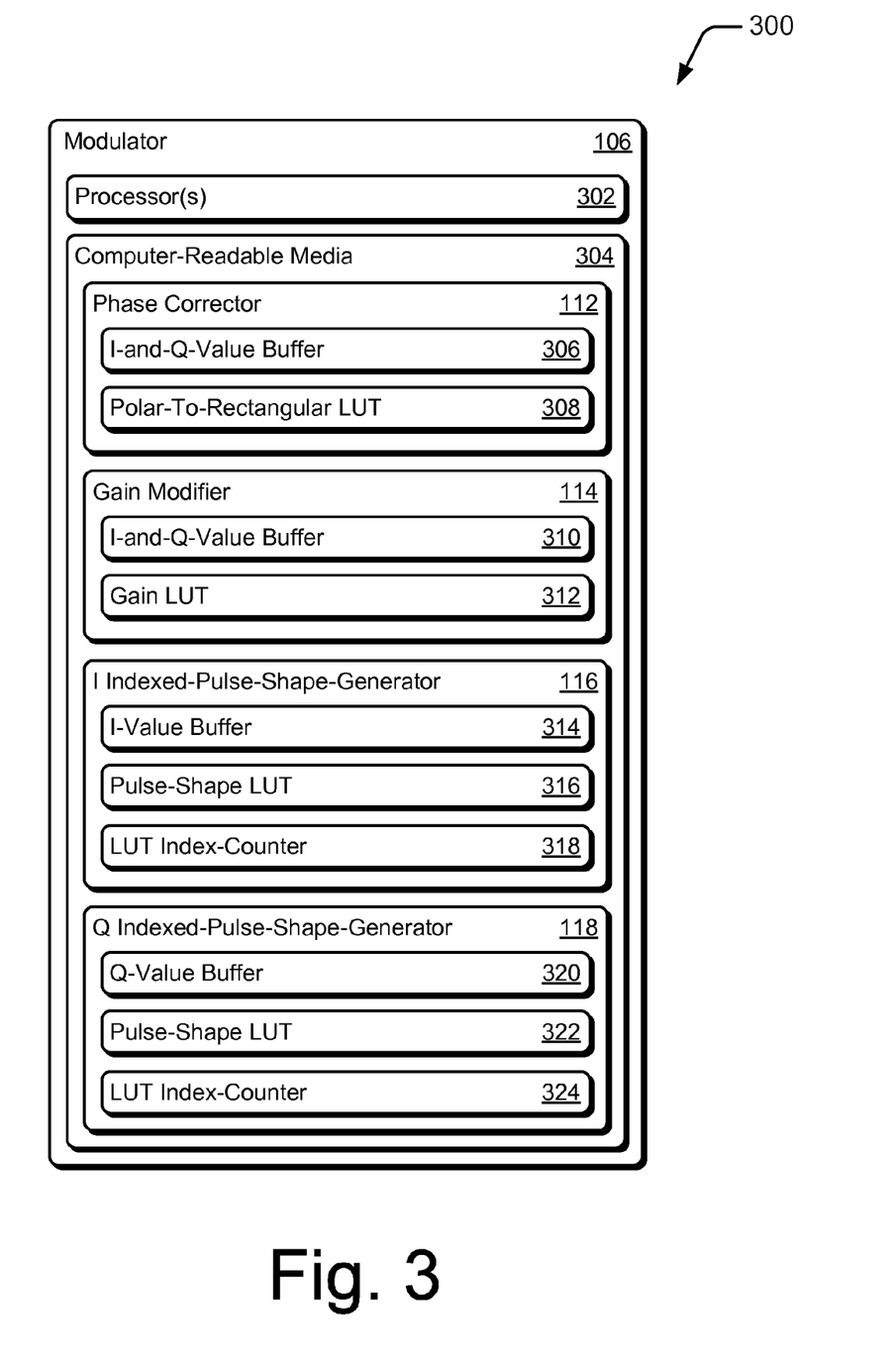
FIG. 3 illustrates a more-detailed embodiment of part of FIG. 1.

To provide still greater detail, consider an example detailed embodiment of modulator 106 illustrated in FIG. 3. Modulator 106 includes one or more processors 302 and computer-readable media 304, which includes phase corrector 112, gain modifier 114, I indexed-pulse-shape-generator 116, and Q indexed-pulse-shape-generator 118. Note however, that this is but one detailed example; each of these entities of modulator 106 may be implemented in hardware, software, or a combination thereof.

Phase corrector 112 includes I-and-Q-value buffer 306 and polar-to-rectangular lookup-table (LUT) 308. Buffer 306 receives I value 102 and Q value 104. Polar-to-rectangular LUT 308 includes degrees of rotation for correcting a phase shift and corresponding correction I and Q values. To minimize the die area used by the table, symmetry is exploited. Polar-to-rectangular LUT 308 includes I and Q values for zero, ten, twenty, thirty, and forty degrees. Phase corrector 112 can determine I and Q values for all other degrees of rotation by inversion or by swapping I with Q. For example, 320 (−40) degrees has I and Q values identical to forty degrees when Q is inverted and 100 degrees has I and Q values identical to ten degrees when I and Q are swapped and the swapped I is inverted (i.e. for ten degrees I=COS($\pi$/18), Q=SIN($\pi$/18); for 100 degrees I=−SIN($\pi$/18)=COS(10$\pi$/18), Q=COS($\pi$/18)=SIN(10$\pi$/18)).

Phase corrector 112 determines that a given power amplification will result in a phase shift and determines a degree of rotation required to correct the phase shift. Phase corrector 112 then retrieves correction I and Q values from polar-to-rectangular LUT 308 that correspond to the degree of rotation required. Phase corrector 112 uses the correction I and Q values to rotate I value 102 and Q value 104 by the degree of rotation. The following is the equation for determining a phase-corrected (rotated) I value:

$$I_{new}=I*A-Q*B$$

The following is the equation for determining a phase-corrected (rotated) Q value:

$$Q_{new}=Q*A+I*B$$

I represents I value 102, Q represents Q value 104, A represents the correction I value, B represents the correction Q value, $I_{new}$ represents the phase-corrected I value, and $Q_{new}$ represents the phase-corrected Q value. In this embodiment, four multiplications and two summations are performed for a given rotation. Because the correction I and Q values corresponding to the degrees of rotation are computed ahead of time, they do not have to be computed at runtime from the degrees of rotation. This reduces the amount of computational logic and thus peak and average current are reduced as well as die area usage.

As shown in FIG. 3, gain modifier 114 includes I-and-Q-value buffer 310 and Gain lookup-table (LUT) 312. I-and-Q-value buffer 310 receives the phase-corrected I and Q values from phase corrector 112. Gain LUT 312 includes all 401 possible gain decibel values (for 0.05 decibel increments from zero to 20 decibels) in linear form. Thus, starting at a first index in the table, gain modifier 114 can simply increment to the next index in order to get the next increment of 0.05 decibels. Because the decibel values are in linear form they can immediately be multiplied with the phase corrected I and Q values to produce phase-corrected gain-modified I and Q values. This requires less computational logic as the linear equivalent of each decibel value is pre-computed and stored in gain LUT 312.

Continuing this detailed example, I indexed-pulse-shape-generator 116 receives the phase-corrected gain-modified I value from gain modifier 114 at a rate of 3.84 million values per second. I indexed-pulse-shape-generator 116 generates a pulse shape for the phase-corrected gain-modified I value and oversamples by a factor of 16.25 per value. I indexed-pulse-shape-generator 116 may also implement a timing advance or retardation, which shifts the pulse samples for all nine I values forward or backwards in time by one quarter of a value time. A value time is the time between incoming I or Q values. In this embodiment the value time is one, divided by 3.84 million seconds. Each I value 102 persists for nine value times and thus pulses for nine I values 102 overlap. Each pulse has 146.25 samples (e.g., three pulses have 146 samples for every pulse that has 147 samples). For each sample, the sample of eight other I-value pulses are added to create a final I-signal sample that is passed on to I digital-to-analog converter (IDAC) 120 at a rate of 62.4 million samples per second. Q indexed-pulse-shape-generator 118 operates similarly to I indexed-pulse-shape-generator 116, though operating on Q values 104 instead of I values 102 and creating Q-signal samples that are communicated to Q digital-to-analog converter (QDAC) 122.

I indexed-pulse-shape-generator 116 includes I-value buffer 314, pulse-shape lookup-table (LUT) 316, and LUT index-counter 318. I-value buffer 314 receives the phase-corrected gain-modified I value from gain modifier 114. I-value buffer 314 contains the nine previously received phase-corrected gain-modified I values. When the phase-corrected gain-modified I value is received from gain modifier 114, I indexed-pulse-shape-generator 116 shifts the nine previously received phase-corrected gain-modified I values so that the oldest I value is discarded from I-value buffer 314 and the phase-corrected gain-modified I value is shifted into I-value buffer 314. Effectively I indexed-pulse-shape-generator 116 treats I-value buffer 314 as a queue. Pulse-shape LUT 316 contains, in this example, 1170 pulse-shape coefficients that when multiplied by an I value will generate the first half of a root-raised-cosine-shaped pulse for the I value. The first half is stored since the second half is symmetrical and can be generated by moving through pulse-shape LUT 316 in reverse order. Using this embodiment of modulator 106 shown in FIG. 3, the amount of die area necessary for LUT 316 is reduced by about one half.

I indexed-pulse-shape-generator 116 handles the oversampling of 16.25 by oversampling at 260 samples per value time and under-sampling by sixteen samples per value time. I indexed-pulse-shape-generator 116 initializes LUT index-counter 318 with a value of zero and increments counter 318 by sixteen. When a resulting index value is over 260 the resulting index value is reduced by 260 and I-value buffer 314 is shifted to get a new I value. Thus, every new I value starts with an index value of zero, four, eight, or twelve, which explains the 0.25 of the 16.25 oversample rate. Note that I values starting with an index of four, eight, or twelve will have one less sample for that value time than those starting with an index of zero.

At each sampling, the value in LUT index-counter 318 is used to find a pulse-shape coefficient within pulse-shape LUT 316 for each of the nine I values in I-value buffer 314. Note that each of the found coefficients are 260 increments from each other in LUT 316. For example, the index values used to look-up coefficients when the value in counter 318 is zero are: 0, 260, 520, 780, 1040, 1039, 779, 519, and 259. These index values assume that index values range from zero to 1209 for LUT 316. LUT 316 may also be segmented into nine segments to allow for simultaneous access by each of nine lookup operations corresponding to each I value. The nine segments are from indices 0-129, 134-259, 260-389, 390-519, 520-649, 650-779, 780-909, 910-1039, and 1040-1169. Here the timing advance and retardation are accomplished by incrementing or decrementing counter 318 by sixty five (¼ of 260 and thus ¼ of a value time).

Q indexed-pulse-shape-generator 118 operates similarly to I indexed-pulse-shape-generator 116. Q indexed-pulse-shape-generator 118 operates on Q values 104 instead of I values 102. Q indexed-pulse-shape-generator 118 includes a Q-value buffer 320, a pulse-shape lookup-table (LUT) 322, and a LUT index-counter 324, which Q indexed-pulse-shape-generator 118 uses to generate pulse shapes for Q values 104 instead of I values 102.

At this point these example operations of modulator 106 are complete. Continuing this detailed example, however, converter 108, using IDAC 120 and QDAC 122, receives final I-signal samples from I indexed-pulse-shape-generator 116 and final Q-signal samples from Q indexed-pulse-shape-generator 118, respectively. IDAC 120 and QDAC 122 output analog I and Q signals, also respectively.

Note that here conversion to analog is complete, though processing for transmission can be performed, such as by transmission processor 110. Transmission processor 110 receives, at mixers 124 and 126, I and Q analog signals, respectively. Local oscillator (LO) 128 provides a frequency signal for transmission. Quadrature circuit 130 provides a ninety-degree phase shift. This phase shift causes the frequency signal output to mixer 124 to be ninety degrees out of phase with the frequency signal provided to mixer 126. Mixers 124 and 126 mix the analog I and Q signals with the frequency signals provided by quadrature circuit 130 to create up-converted I and Q signals. The up-converted I and Q signals are output to combiner 132. Combiner 132 combines the up-converted I and Q signals into a transmittable signal 134. Transmittable signal 134 may be transmitted as is or may be further modified (e.g., amplified).

Note that one or more of the entities shown in FIGS. 1 and/or 3 may be further divided, combined, and so on. Thus, these entities illustrate some of many possibilities (alone or combined) that are capable of employing the described techniques.

Figure 4:
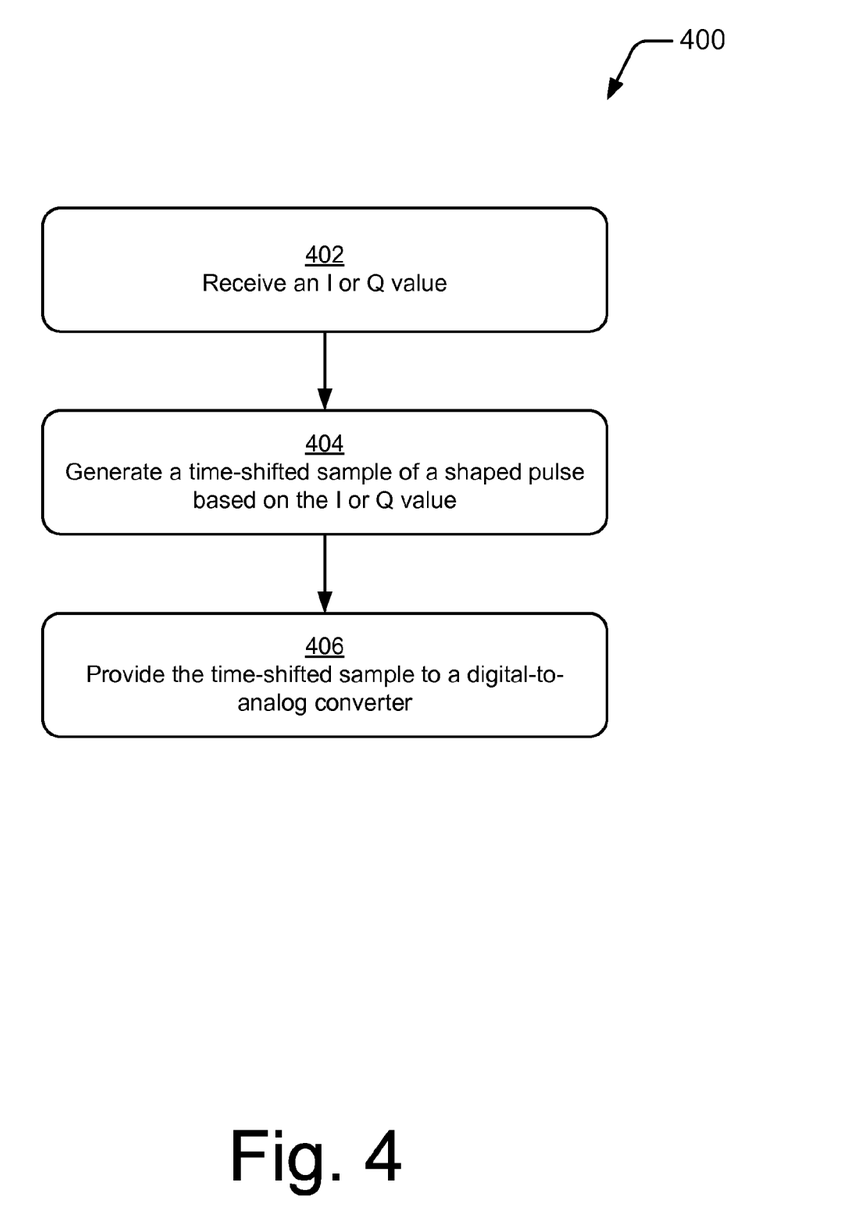
FIG. 4 illustrates a method for modulating data for WCDMA in accordance with one or more embodiments.

FIG. 4 illustrates a method 400 for Improving WCDMA Modulation. These techniques may include at least the method illustrated below. Aspects of the method may be implemented in hardware, firmware, software, or a combination thereof. The method is shown as a set of acts that specify operations performed by one or more entities and is not necessarily limited to the order shown.

At 402, an I or Q value is received. The I or Q value may have been amplified and corrected for phase distortion. At 404, a time-shifted sample of a shaped pulse based on the I or Q value is generated. At 406, the time-shifted sample is provided to a digital-to-analog converter.

By way of example, consider application of method 400 to the operating environment illustrated in FIG. 1. In this environment, modulator 106 performs the operations of method 400. Modulator 106, through phase corrector 112, receives a non-amplified non-phase-corrected I or Q value (102 or 104). Phase corrector 112 receives information from an external source indicating that an amplification of the non-amplified non-phase-corrected I or Q value will result in a phase distortion. Phase corrector 112 rotates the non-amplified non-phase-corrected I or Q value to correct for the phase distortion.

In some embodiments, phase corrector 112 uses a polar-to-rectangular lookup-table (LUT), such as polar-to-rectangular LUT 308 of FIG. 3, to aid in the rotation. Phase corrector 112 rotates the non-amplified non-phase-corrected I or Q value by a number of degrees, such as ten, and in increments of ten degrees. Ten-degree increments are not required but are effective and do not require as large a lookup-table 308 as smaller-degree increments. By rotating the non-amplified non-phase-corrected I or Q value, phase corrector 112 creates a non-amplified phase-corrected I or Q value, which it communicates to gain modifier 114.

Modulator 106, through gain modifier 114, receives the non-amplified phase-corrected I or Q value from phase corrector 112. Gain modifier 114 determines a gain coefficient using a gain lookup-table (LUT), such as gain LUT 312 of FIG. 3. Gain modifier 114 modifies both the I and Q of each non-amplified phase-corrected I or Q value pair using unique gain coefficients.

At 402, the I or Q value is received by I indexed-pulse-shape-generator 116 or Q indexed-pulse-shape-generator 118, respectively. I or Q indexed-pulse-shape-generator (116 or 118) generates a time-shifted sample of a shaped pulse based on the I or Q value (102 or 104). I or Q indexed-pulse-shape-generator (116 or 118) may use a pulse-shape lookup-table (LUT), such as pulse shape LUT 316 or 322 of FIG. 3, to oversample the I or Q value by 260 and under-sample the I or Q value (e.g., by 16). Pulse-shape LUT 316 and 322 contain pulse-shape coefficients that I or Q indexed-pulse-shape-generator (116 or 118) multiplies with the I or Q value to generate samples that together form a shaped pulse. I or Q indexed-pulse-shape-generator (116 or 118) determines whether or not a request to advance or retard the signal has been made. If such a request has been made, I or Q indexed-pulse-shape-generator (116 or 118) can modify the index used to lookup coefficients in pulse-shape LUT 316 by positive or negative 65 (i.e. ¼ of 260). The next sample generated will be the time-shifted sample generated at 404.

In some embodiments the time-shifted sample is combined with other time-shifted samples prior to being provided to a digital-to-analog converter at 406. I or Q indexed-pulse-shape-generator (116 or 118) combines the time-shifted sample with time-shifted samples of eight other I or Q values (102 or 104). In this example, an I or Q value persists in I or Q value buffers 314 or 320 for nine total value-times (the rate of repeating 402). I or Q indexed-pulse-shape-generator (116 or 118) generates different parts of a pulse for each I or Q value. As I or Q indexed-pulse-shape-generator (116 or 118) receives new I or Q values at 402, the oldest I or Q values are discarded. By the time I or Q indexed-pulse-shape-generator (116 or 118) has shifted an I or Q value through buffers 314 or 320 a fully shaped pulse has been generated for that I or Q value. I or Q indexed-pulse-shape-generator (116 or 118) repeats 404 and 406 at a rate that is 16.25 times faster than 402 is repeated. At each instance of 404 a single sample of each I or Q value's shaped pulse is generated. These single samples are combined prior to 406.

At 406 I or Q indexed-pulse-shape-generator (116 or 118) provides the time-shifted sample, possibly within a combination of samples, to I digital-to-analog-converter (IDAC) 120 or Q digital-to-analog-converter (QDAC) 122. IDAC or QDAC (120 or 122) then converts received samples into an analog signal.

One or more of the techniques described above can be performed by one or more programmable processors executing a computer program to perform functions by operating on input data and generating output. Generally, the techniques can take the form of an entirely hardware embodiment, an entirely software embodiment, or an embodiment containing both hardware and software components. In one implementation, the methods are implemented in software, which includes but is not limited to firmware, resident software, microcode, etc. Furthermore, the methods can take the form of a computer program product accessible from a computer-usable or computer-readable medium providing program code for use by or in connection with a computer or any instruction execution system.

For the purposes of this description, a computer-usable or computer-readable medium can be any apparatus that can contain, store, communicate, propagate, or transport the program for use by or in connection with the instruction execution system, apparatus, or device. The medium can be a non-transitory electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Although the subject matter has been described in language specific to structural features and/or methodological techniques and/or acts, it is to be understood that the subject matter defined in the appended claims is not necessarily limited to the specific features, techniques, or acts described above, including orders in which they are performed.

What is claimed is:

1. A system comprising:
   a digital-to-analog converter;
   a pulse-shape look-up table;
   an indexed pulse-shape-generator configured to:
      receive an I or Q value that has been amplified and corrected for phase distortion;
      increment or decrement an index of the indexed pulse-shape-generator to implement timing advancement or timing retardation via the indexed pulse-shape-generator;
      retrieve, based on the incremented or decremented index, a pulse-shape coefficient from a pulse-shape lookup-table;
      create a time-shifted sample of a shaped pulse based on the I or Q value and the pulse-shape coefficient; and
      provide the time-shifted sample to the digital-to-analog converter.

2. The system as recited in claim 1, wherein the index is incremented or decremented by a quarter of a value time to implement the timing advancement or timing retardation.

3. The system as recited in claim 1, wherein the digital-to-analog converter is configured to produce an analog signal using the time-shifted sample, the analog signal being part of a transmittable signal.

4. The system as recited in claim 1, further comprising:
   a gain look-up table; and
   a gain modifier, the gain modifier configured to:
      receive a non-amplified phase-corrected I or Q value;
      determine a gain coefficient using a gain lookup-table; and
      modify the non-amplified phase-corrected I or Q value by the gain coefficient to produce the I or Q value.

5. The system as recited in claim 4, wherein the gain modifier is further configured to increment an index for each pair of the non-amplified phase-corrected I or Q values, the index used to retrieve the gain coefficient from the gain lookup-table.

6. The system as recited in claim 4, further comprising:
   a polar-to-rectangular lookup-table; and
   a phase corrector, the phase corrector configured to:
      receive an I or Q value;
      determine that an amplification of the I or Q value will result in a phase distortion;
      retrieve a correction I or Q value from the polar-to-rectangular lookup-table, the correction I or Q value corresponding to a rotation that corrects the phase distortion; and
      create the non-amplified phase-corrected I or Q value using the I or Q value and the correction I or Q value, the non-amplified phase-corrected I or Q value being a rotated version of the I or Q value.

7. The system as recited in claim 1, wherein the pulse-shape lookup-table is segmented into multiple segments effective to enable a number of simultaneous lookup operations.

8. The system as recited in claim 1, wherein the indexed pulse-shape-generator is configured to provide the time-shifted sample at a first rate of repetition that is higher than a second rate of repetition at which the indexed pulse-shape-generator is configured to receive gain-modified phase-corrected I or Q values.

9. A method comprising:
   receiving an I or Q value;
   generating, via a pulse-shape lookup-table, a time-shifted sample of a shaped pulse based on the I or Q value, the time-shifted sample generated at least in part by modifying an index value of the pulse-shape lookup-table to advance or retard a timing of the time-shifted sample; and
   providing the time-shifted sample to a digital-to-analog converter.

10. The method as recited in claim 9, wherein modifying the index value of the pulse-shape lookup-table increments or decrements the index value, the index value used to retrieve a pulse-shape coefficient from the pulse-shape lookup-table, the pulse-shape coefficient used to generate the time-shifted sample.

11. The method as recited in claim 10, wherein each of pulse-shape coefficient of the pulse-shape lookup-table are indexed 260 counts from each other and the index value is incremented or decremented by 65 counts to advance or retard the timing of the time-shifted sample.

12. The method as recited in claim 10, wherein the index value is incremented or decremented by a quarter of a value time to advance or retard the timing of the time-shifted sample.

13. The method as recited in claim 9, wherein receiving the I or Q value comprises receiving a non-amplified phase-corrected I or Q value, the method further comprising:
   determining a gain coefficient using a gain lookup-table; and
   modifying the non-amplified phase-corrected I or Q value by the gain coefficient to produce the I or Q value.

14. The method as recited in claim 13, wherein receiving the I or Q value comprises receiving a non-amplified non-phase-corrected I or Q value, the method further comprising:
   receiving the non-amplified non-phase-corrected I or Q value;
   determining that an amplification of the non-amplified non-phase-corrected I or Q value will result in a phase distortion; and rotating the non-amplified non-phase-corrected I or Q value to correct the phase distortion to produce the non-amplified phase-corrected I or Q value.

15. A System-on-Chip comprising:
a digital-to-analog converter configured to generate analog signals useful to transmit data;
a modulator configured to:
receive an I or Q value;
modify an index value of an indexed pulse-shape lookup-table to advance or retard a timing shaped pulse generated using pulse-shape coefficients of the indexed pulse-shape lookup-table;
generate, via the indexed pulse-shape lookup-table, a time-shifted sample of a shaped pulse based on the I or Q value; and
provide the time-shifted sample to the digital-to-analog converter.

16. The System-on-Chip as recited in claim 15, wherein the pulse-shape lookup-table is segmented into multiple segments effective to enable a number of simultaneous lookup operations.

17. The System-on-Chip as recited in claim 15, wherein the index value is incremented or decremented by a quarter of a value time to advance or retard the timing of the time-shifted sample.

18. The System-on-Chip as recited in claim 15, wherein the modulator is further configured to:
receive a non-amplified phase-corrected I or Q value;
determine a gain coefficient using a gain lookup-table; and
modify the non-amplified phase-corrected I or Q value by the gain coefficient to produce the I or Q value.

19. The System-on-Chip as recited in claim 18, wherein the modulator is further configured to increment an index for each pair of the non-amplified phase-corrected I or Q values, the index used to retrieve the gain coefficient from the gain lookup-table.

20. The System-on-Chip as recited in claim 15, wherein the System-on-Chip is configured to generate analog signals for transmitting data in compliance with a wideband code division multiple access (WCDMA) communication standard.

* * * * *